Figure 4:
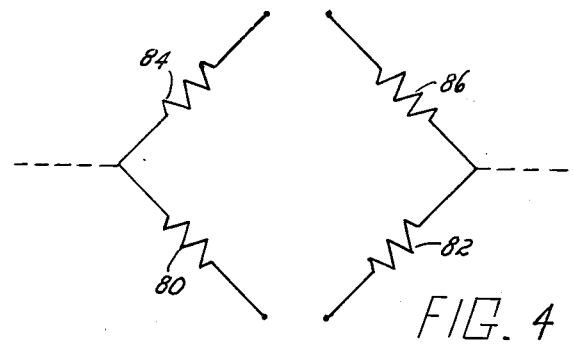

Oct. 31, 1961  YAO T. LI  3,006,193
PRESSURE GAUGE
Filed March 12, 1957
2 Sheets-Sheet 1

INVENTOR.
Yao Tzu Li
BY
George L. Greenfield
atty

United States Patent Office 3,006,193
Patented Oct. 31, 1961

3,006,193
PRESSURE GAUGE
Yao T. Li, 28 Orchard St., Watertown, Mass.
Filed Mar. 12, 1957, Ser. No. 645,595
7 Claims. (Cl. 73—406)

This invention relates to pressure gauges and more particularly comprises a new and improved pressure gauge suited for use in measuring pressures in the combustion chambers of rocket motors.

Pressure measuring devices used in rocket reseach must have efficient cooling systems and various arrangements have been employed to pass a cooling medium such as water through the pressure sensing element. However, all of the earlier devices have failed to prove wholly satisfactory. In some cases the system proved to be inadequate because of insufficient contact between the cooling medium and the various portions of the pressure sensing device. In other gauges which included a number of independent parallel passages to carry the medium to the various portions in the sensing device it was impossible to assure even distribution of the coolant, so that local over-heating often resulted and caused physical failure of the device. In fact, in a cooling system with parallel passages the distribution is basically unstable, in that if any one passage is overheating, steam may be generated in that passage to cause more restriction. This situation is usually uncontrollable because there is no indication to the user that restriction has occurred.

The primary object of my invention is to provide a cooling system for a pressure sensing element in a pressure gauge, which provides intimate contact between the cooling medium and all portions of the pressure sensing element.

Still another important object of my invention is to provide a pressure gauge having a cooling system with but a single passage and that fully guarantees uniform distribution and at the same time may be examined by inspection.

To accomplish these and other objects, my pressure gauge includes a cylindrical casing open at one end. Across that end of the casing are a pair of spaced apart spirally formed diaphraghms. The outer of the two diaphragms is positioned to be directly exposed to the pressure to be measured while the other of the diaphragms transmits the response of the first diaphragm to a signaling device within the casing. Formed in the casing are inlet and outlet passages which are positioned to direct a cooling medium such as water into and out of the space between the diaphragms. A double spiral ribbon made of rigid material is disposed in the space between the diaphragms and defines a passage which first spirals inwardly toward the center of the space and then outwardly to the outlet passage in the casing so that a single passage is formed between the diaphragms for the flow of the water. This ribbon together with the facing surfaces of the spiral diaphragms defines a single passage for the cooling medium and directs the medium into intimate contact with the entire inner surfaces of the diaphragms. The ribbon also serves as a force transmitting member between the diaphragms.

Figure 1:
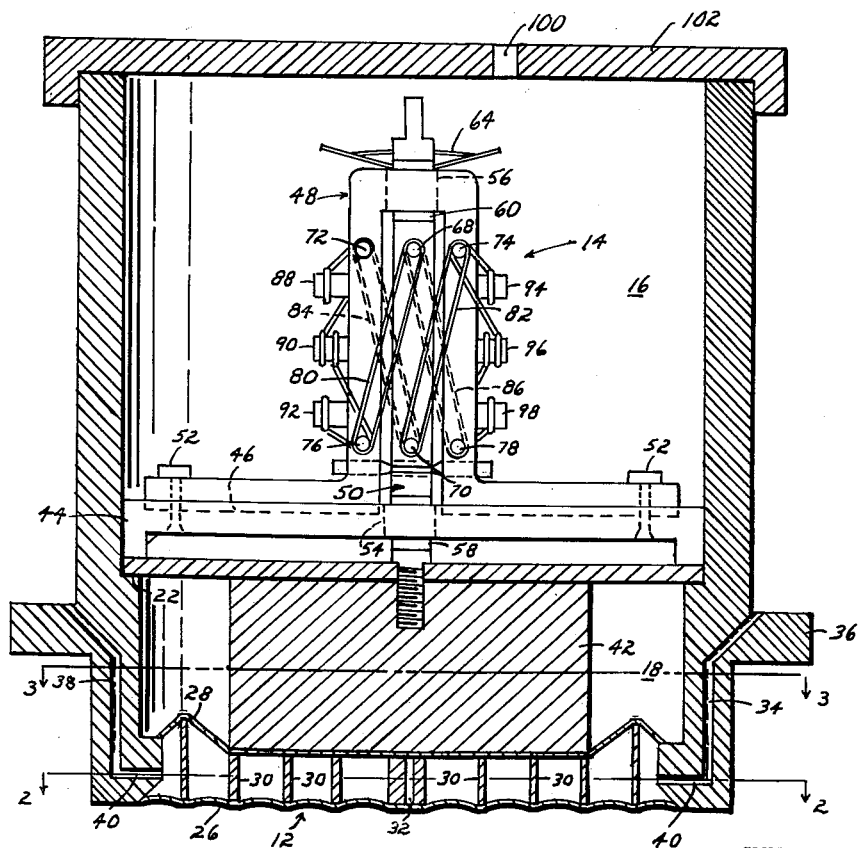
Figure 3:
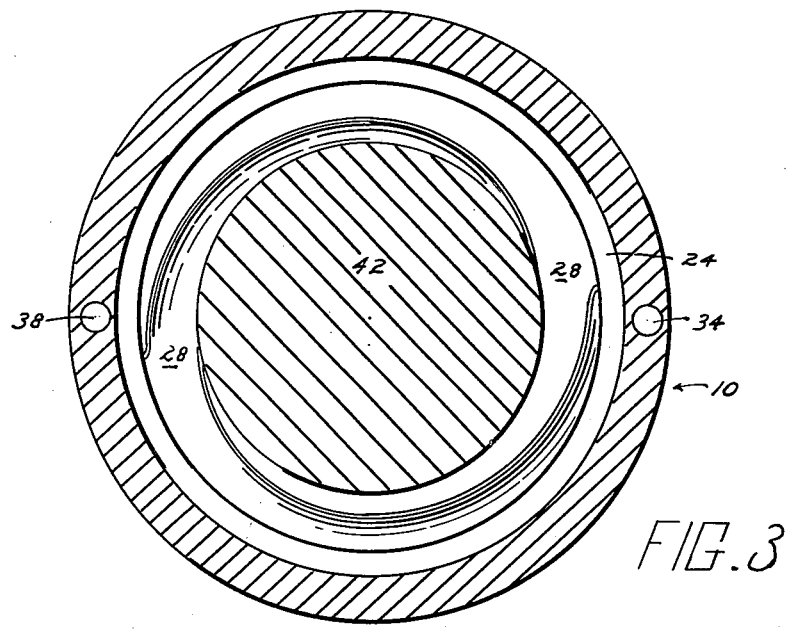
Figure 2:
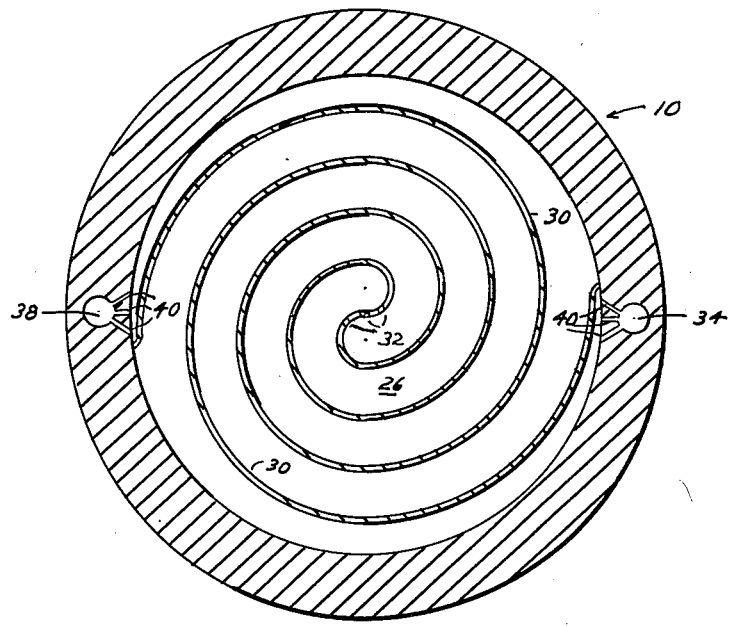

These and other objects and features of my invention along with incident advantages will be better understood and appreciated from the following detailed description of one embodiment thereof, selected for purposes of illustration and shown in the accompanying drawing in which:

FIGURE 1 is a front view partially in section of a pressure gauge constructed in accordance with my invention, FIGURES 2 and 3 are cross-sectional views taken along the corresponding section lines in FIGURE 1, and FIGURE 4 is a schematic diagram of the signaling device shown in FIGURE 1.

The embodiment of my invention shown in the drawing includes in its general organization a casing 10 within which are positioned a pressure sensing device 12 and a signaling device 14. The cylindrical casing 10 is generally divided into upper and lower chambers 16 and 18, respectively, by a rather rigid diaphragm 20 seated on a shoulder 22 formed on the inner surface of the casing 10. A flange 24 extending inwardly about the lower end of the cylindrical casing supports the pressure sensing device 12.

The pressure sensing device 12 includes an outer spiral diaphragm 26 and an inner spiral diaphragm 28. The outer diaphragm 26 has its periphery connected to the lower surface of the flange 24 while the inner diaphragm 28 has its periphery secured to the upper surface of that flange. These connections may be made by any conventional means. Between the two diaphragms is a double spiral ribbon 30 which is best shown in FIGURE 2. It will be noted that the ribbon 30 has its ends connected to the inner surface of the flange 24 approximately 180° apart. With reference to FIGURE 2 it will be noted that the ribbon 30 defines a spiral passage which winds inwardly from the right side in a clockwise direction until it reaches the approximate center of the diaphragms where it turns in a counterclockwise direction and winds outwardly until the passage reaches the left side of the cylindrical wall. A number of openings 32 are formed at the center of the ribbon to interconnect the clockwise and counterclockwise portions of the passage. An inlet passage 34 extends downwardly through a flange 36 formed on the outer surface of the cylindrical casing 10 and through the lower portion of the casing, and turns inwardly through the flange 24 to direct the cooling medium into the spiral passage between the diaphragms. A similar passage 38 is formed in the casing 10 and serves as an outlet to carry water out of the gauge which has passed through the space between the diaphragms. To insure easy flow of the water in and out of the spiral passage from the inlet and outlet passages 34 and 38, a number of small openings 40 are formed in the flange 24.

It will be appreciated that any obstruction which forms in the spiral passage defined by ribbon 30 will restrict or completely stop the flow of the cooling medium between the diaphragms. Such an occurrence can be immediately detected by the reduced flow of the cooling medium out of the outlet passage 38. Just as soon as an operator observes such an occurrence, he should withdraw the pressure gauge from its mounting (not shown) to prevent any serious damage to the instrument caused by the heat of the combustion chamber.

From the foregoing description it is obvious that pressure applied to the outer surface of catenary diaphragm 26 will cause it to move upwardly toward the interior of the casing 10. The ribbon 30 which is made of a rigid material such as metal serves as a forced transmitting member and causes the inner diaphragm 28 to move in tandem with the outer diaphragm. This motion of the diaphragms in response to pressure is transmitted through a block 42 to the signaling device 14. The stiff high pressure diaphragm 20 which extends across the casing 10 limits the movement of the spiral diaphragms to a very small distance.

The signaling device 14 is supported on a disc 44 which retains the stiff diaphragm 20 on the shoulder 22. The disc 44 has a pair of aligned recesses 46 in its upper surface which receive the base of the signaling device 14. It is to be understood that the signaling device illustrated is intended merely to be exemplorary of a whole class of devices which may be used in connection with the pressure sensing element of my invention, and the details of the signaling device disclosed form no part of this invention. The signaling device illustrated is disclosed fully in a co-pending application of which I am co-inventor with Shih-Ying Lee, filed December 17, 1956, Serial No. 628,624. The signaling device 14 is an unbonded strain gauge and includes a U-shaped yoke 48 and an armature 50. The yoke 48 which may be integrally formed with the base disposed within the recesses 46 is held stationary by means of the rivets 52 which extend through the base and the disc 44. An opening 54 is formed in the center of the disc 44 and a second opening 56 aligned with the opening 54 is formed in the top of the yoke 48 and receive the bosses 58 and 60 formed at the bottom and top of the armature, respectively. The bosses 58 and 60 are of such diameters that neither is in actual contact with the sidewalls of the openings 54 and 56. A centering pin 62 is received in the opposite arms of the yoke and has a reduced central portion loosely received in an opening of the armature to permit a limited amount of relative movement of the armature with respect to the yoke. A spring clip 64 connected to the top of the yoke 48 and the upper portion of the armature 50 restrains motion of the armature other than in a longitudinal direction with respect to the yoke.

A pair of strain wire supporting pins 68 and 70 pass through the armature 50 and are suitably coated with an insulated lacquer covering. Similar pins 72 and 74 pass through the upper portions of the arms of the yoke 48 and an additional set of pins 76 and 78 pass through the lower portions of the arms of the yoke and form the entire support for the windings. As shown in FIGURE 1, four sets of windings are carried on the pins and are indicated at 80, 82, 84 and 86. Windings 80 and 82 are wound on the front of the strain gauge as viewed in FIGURE 1, while the other windings are carried on the rear surface. Each winding is wound between one of the fixed pins on the yoke and one of the pins on the movable armature and are inclined slightly from the vertical as shown in FIGURE 1. Thus the winding 80 is wound in several turns about the pins 68 and 76 and the winding 82 is wound in several turns about the pins 74 and 70 and, as shown in FIGURE 4, comprise adjacent legs of the bridge circuit. Winding 84 is wound in several turns about the pins 70 and 72 while winding 86 is wound in several turns about the pins 68 and 78 and comprise the other adjacent legs of the circuit.

For convenience a number of terminal posts 88, 90, 92, 94, 96 and 98 are carried on the side of the yoke to facilitate the making of external connections to the strain wires. It will be noted that one end of winding 80 and one end of winding 84 are connected to the terminal post 90 and similarly one end of winding 82 and one end of winding 86 are connected to the terminal post 96, each forming the opposite connection in the bridge circuit.

It will be understood that the wires are wound under some initial tension as is customary in the unbonded strain gauge art. In operation, upward movement of the armature 50 causes the windings 80 and 86 to stretch, and thus the resistance in the opposite legs of the bridge circuit increases, while the windings 82 and 84 under similar movement of the armature decrease in length and reduce in resistance. Because of the manner in which the wires are wound on the gauge, a large electrical signal is produced by even a small movement of the armature.

Having described in detail each of the components of the pressure gauge, I will now describe the operation of the unit. To measure the pressure in a combustion chamber, the indicator is inserted into an opening formed in the combustion chamber wall (not shown) and the outer diaphragm is exposed directly to the internal pressure in the chamber. If this pressure is greater than the ambient pressure exerted against the inner diaphragm 28, the pressure sensing device moves upwardly in the casing 10, the forces exerted against the outer diaphragm 26 being transmitted through the ribbon 30 to the inner diaphragm 28, the block 42 and the armature 50 of the signaling device 14. It will be noted at this time that the outermost turn of the ribbon from each side of the flange 24 is of a greater height than the other portions of the ribbon so that the unsupported part of the inner diaphragm is allowed to deform into a deep spiral groove to transmit the pressure load received from the outer diaphragm by means of pure tensile strength of the inner diaphragm, and at the same time maintains the outer diaphragm with an essentially flat configuration.

The deep grooves in the inner diaphragm prevents the ribbon from moving in a sideways direction and this is essential to limit the hysteresis effect of the instrument when cycling pressure is applied. The flat contour of the other diaphragm is important to assure tight contact between this diaphragm and the ribbon.

The upward movement of the armature 50 causes the wires of the bridge circuit wound between the pins on the yoke and the armature to change in resistance and as is understood by those skilled in the art, a signal is produced which is a function of the pressure exerted on the outer diaphragm 26.

The effective cooling of the diaphragm will prevent any heat damage to the pressure sensing element in the gauge. The operator will readily be able to detect any interruption in the flow of the cooling medium through the spiral passage and should the operation of the cooling system be impaired, he will immediately withdraw the gauge from the opening in the wall of the combustion chamber, if possible, or alternatively, stop the operation of the motor, to prevent the instrument from burning out. The direct effect of the pressure exerted on the outer diaphragm 26 upon the windings of the strain gauge may be recorded on a meter disposed at some remote location from the gauge. The connection between the meter and the end of the windings may be made by passing the leads through the opening 100 formed in the cover member 102 of the casing.

From the foregoing description those skilled in the art will appreciate that numerous modifications may be made of my invention without departing from the spirit thereof. Therefore, I do not intend to limit the breadth of my invention to the single embodiment illustrated and described but rather it is my intention that the scope of this invention be determined by the appended claims and their equivalents.

What I claim as new and desired to secure by Letters Patent of the United States is:

1. In a pressure gauge, a cylindrical casing open at at least one end, an inwardly extending flange formed at the open end of the casing, a first spirally formed diaphragm connected to the flange and closing the open end of the casing, a second spirally formed diaphragm secured to the flange and spaced inwardly from the first diaphragm and defining a cavity between them, a ribbon having its ends secured to opposite sides of the flange and forming a double spiral between the diaphragms, the double spiral of the ribbon and the opposing faces of the diaphragms forming a single spiral passage from the flange to the center of the cavity and back to the flange, a force transmitting member mounted on the second diaphragm with its periphery spaced inwardly from the flange, the portion of the ribbon disposed between the diaphragms and beyond the periphery of the force transmitting member extending above the bottom of the force transmitting member and causing the outer marginal portion of the second diaphragm to extend upwardly in an inwardly direction from the flange and downwardly and inwardly from the last named portion of the ribbon to the transmitting member, a signaling device secured to the transmitting member and responsive to movement of the transmitting member and an inlet and an outlet passage formed in the casing for directing a cooling medium through the spiral passage between the diaphragms.

2. In a pressure gauge having a casing open at one end, a pressure sensing device comprising a pair of substantially parallel and spaced apart diaphragms secured to the casing across the open end and defining a cavity between them, a double spiral ribbon having one end secured to the casing between the diaphragms and winding inwardly in one circular direction and in spaced apart turns toward the center of the cavity and then winding outwardly in turns from the center in the other circular direction between the spaced apart turns and having its other end secured to the casing opposite the first end of the ribbon, at least a portion of the outer turn of the ribbon circling in each direction being of greater width than the remaining portion of the ribbon, the edges of said ribbon engaging the diaphragms defining only one continuous spiral passage from one end of the ribbon to the other and with adjacent portions of the spiral passage being separated by only a single turn of ribbon, and means for directing a cooling fluid through the spiral passage, all of said cooling fluid flowing through the full length of the same single passage and contacting substantially the entire facing surfaces of the diaphragms.

3. A pressure sensing device comprising a flexible circular first diaphragm, a second circular diaphragm spaced from the first diaphragm and generally parallel thereto, a support for the diaphragms at their peripheries, a flexible elongated ribbon having its edges secured to the facing surfaces of the diaphragms and defining with the facing surfaces a single elongated continuous passage of substantially uniform cross section over the facing surfaces, said ribbon causing the two diaphragms to move axially in tandem when unequal forces are applied to them, an inlet and outlet provided in the support for directing a cooling medium through the passage, a circular force transmitting member disposed on the central portion of the outer surface of the second diaphragm, means forming part of the ribbon supporting the portion of the second diaphragm disposed radially between its periphery and the force transmitting member further away from the first diaphragm than is the central portion of the second diaphragm, and means operatively connected to the force transmitting member for producing a signal which is a function of the displacement of the first and second diaphragms.

4. A pressure sensing device comprising a flexible first diaphragm, a second diaphragm spaced from the first diaphragm and generally parallel thereto, a support for the diaphragms at their edges, flexible partitioning means having its edges secured to the facing surfaces of the diaphragms and defining with the facing surfaces a single elongated passage over the facing surfaces, said partitioning means causing the central portions of the two diaphragms to displace uniformly in tandem when unequal forces are applied to them, the first diaphragm being dished inwardly toward the second diaphragm between points of contact with the partitioning means edge, and an inlet and an outlet in the support for directing a cooling medium through the single passage.

5. A pressure sensing device comprising a flexible first diaphragm, a second flat diaphragm spaced from the first diaphragm and generally parallel thereto, a support for the diaphragms at their edges, a flexible elongated ribbon having its edges secured to the facing surfaces of the diaphragms and defining with the facing surfaces a single elongated passage over the facing surfaces, said ribbon causing the two diaphragms to displace in tandem when unequal forces are applied to them, the first flexible diaphragm being dished inwardly toward the second diaphragm between points of contact with the ribbon, an inlet and an outlet in the support for directing a cooling medium through the single passage, and a stiff third diaphragm operatively connected to the first and second diaphragms and exerting substantial restraint against movement upon the first and second diaphragms.

6. A pressure sensing device as defined in claim 5 further characterized by said passage winding inwardly from the support to the center of the space between the diaphragms and back to the support.

7. A pressure sensing device comprising a flexible first diaphragm, a second diaphragm spaced from the first diaphragm and generally parallel thereto, a support for the diaphragms at their edges, partitioning means secured to the facing surfaces of the diaphragms and defining with the facing surfaces a single elongated passage over the facing surfaces, said partitioning means causing the central portions of the diaphragms to displace uniformly and in tandem when unequal forces are applied to them, the flexible diaphragm being dished inwardly toward the second diaphragm between points of contact with the partitioning means, an inlet and an outlet in the support for directing a cooling medium through the single passage, and restraining means operatively connected to the first and second diaphragms and exerting substantial restraint against movement upon the first and second diaphragms.

References Cited in the file of this patent

UNITED STATES PATENTS

| 2,577,359 | Phipps | Dec. 4, 1951 |
| 2,627,749 | Li | Feb. 10, 1953 |
| 2,741,128 | Gadd et al. | Apr. 10, 1956 |

FOREIGN PATENTS

| 704,685 | Great Britain | Feb. 24, 1954 |